United States Patent [19]

Dighton et al.

[11] Patent Number: 4,705,809
[45] Date of Patent: Nov. 10, 1987

[54] PROCESS FOR PREPARING A POROUS POLYMER ARTICLE

[75] Inventors: Gaylon L. Dighton; Donald W. Pennington, both of Baton Rouge, La.

[73] Assignee: The Dow Chemical Company, Midland, Mich.

[21] Appl. No.: 882,335

[22] Filed: Jul. 7, 1986

[51] Int. Cl.⁴ .................................................. C08J 9/26
[52] U.S. Cl. ........................................ 521/62; 521/61; 521/84.1; 521/143; 521/145
[58] Field of Search .................. 521/61, 62, 84.1, 143, 521/145

[56] References Cited

U.S. PATENT DOCUMENTS

| | | | |
|---|---|---|---|
| 3,367,891 | 2/1968 | Ingram | 521/50.5 |
| 3,388,082 | 6/1968 | Rodgers et al. | 260/17 |
| 3,454,544 | 7/1969 | Young et al. | 260/88.2 |
| 3,873,518 | 3/1975 | Strange et al. | 260/231 A |
| 4,015,067 | 3/1977 | Lin et al. | 536/96 |
| 4,115,492 | 9/1978 | Mahoney et al. | 264/49 |
| 4,425,206 | 1/1984 | Hutchinson | 204/159.18 |
| 4,456,751 | 6/1984 | Messelt et al. | 536/91 |

Primary Examiner—Morton Foelak
Attorney, Agent, or Firm—J. M. Pelton; D. R. Howard

[57] ABSTRACT

A porous polymer article for use as a filter medium or battery separator is prepared by admixing a cellulosic compound and a thermoplastic polymer, both usually in powder form, forming the article under pressure and heat to melt and flow the thermoplastic polymer into a continuous phase and after cooling to set the polymer matrix, contacting the set admixture with a solvent, e.g. water, for the cellulosic compound which will not also dissolve the polymer matrix to produce a porous polymer which has a predetermined degree of porosity and is free from residual salt. The article so produced is also disclosed.

41 Claims, No Drawings

PROCESS FOR PREPARING A POROUS POLYMER ARTICLE

This invention relates to a process for preparing porous thermoplastic articles which find use as filters such as blood and biological filters, battery separators, permeable and semi-permeable films or sheets and the like. More particularly, the invention relates to a method of determining and fixing the degree of porosity according to properties of the starting materials employed.

The preparation of porous polymers is known in the art. Porous polyethylene battery separator sheets are prepared by mixing powdered polyethylene with granular salt, NaCl, fusing the polyethylene to form a continuous phase and washing the fused polyethylene to dissolve and remove the salt. While this is acceptable for some applications and quite inexpensive, residual salt remaining in the polyethylene matrix is not acceptable for purity purposes in some applications, such as biological, bacterial and blood filtration. Further, salt residues adversely affect desirable properties when salt-leached porous polyethylene sheets are used as battery separators.

Another method for producing porous polymers is described in U.S. 4,115,492 to Mahoney, issued Sep. 19, 1978, which describes a process for preparing polyethylene hollow fibers having contiguous microporosity by extruding a heated solution of a polyethylene and an ester, such as butyl stearate or 2-butoxyethyl oleate, from a hollow fiber spinnerette, simultaneously cooling and drawing the forming fibers to a ratio of up to 40 to 1, drawing the gelled fibers to an overall ratio of 1.5/1 to 800/1 and removing the ester so that the maximum pore radius ranges up to about 50 angstroms with a significant increase in permeability over previously made polyethylene hollow fibers. While this process does not include any residual salt as does the prior art process described hereinabove, the process of the '492 patent is more expensive because it involves spinning and drawing equipment and makes hollow fibers. Thus, the art can be improved by an inexpensive process for producing porous polymers and by one which also permits little or no residual salt. These and other features which contribute to satisfaction in use and operation are provided by means of the present invention.

SUMMARY OF THE INVENTION

The present invention provides a process for preparing a porous thermoplastic polymer article having a predetermined degree of porosity, which process comprises the steps of (a) admixing a water soluble cellulosic compound of predetermined particle size and a thermoplastic compound which is insoluble in water;

(b) forming the admixture into a desired shape of said article under conditions sufficient to form a continuous phase of said thermoplastic compound and a non-continuous phase of said cellulosic compound; and (c) contacting said admixture with water to solubilize a major portion of said cellulosic compound and separating the aqueous cellulosic compound-containing solution from the thermoplastic polymer whereby said porous thermoplastic article having a predetermined degree of porosity is produced.

A further feature of the present invention is a porous polymer article prepared by admixture of a water soluble cellulosic compound and a thermoplastic polymer, formation of the admixture into a desired shape under conditions sufficient to form a continuous phase of the thermoplastic polymer and contact of the admixture with water to leach out a substantial portion of said cellulosic compound, whereby a porous thermoplastic polymer article having a predetermined degree of porosity and free from residual salt is produced. Also provided by this invention is a porous polymer sheet or film article free from residual salt comprising a continuous phase of a thermoplastic polymer having a water permeability of from 23 to about 6 ml/10 minutes per square inch (3.7 to about 0.9 ml/10 minutes per square centimeter) and containing 5 to about 15 weight percent of an encapsulated nonleachable cellulosic compound. Although the remaining cellulosic compound is nonleachable in the polymer matrix, the microporous nature of the thin walls surrounding this non-leachable amount of cellulosic material allows passage of water which causes swelling of the cellulosic compound and has the result of decreasing the porosity of the porous polymer article. Upon subsequent drying the porosity returns to its previous level.

DETAILED DESCRIPTION OF PREFERRED EMBODIMENTS

The process of the present invention employs a cellulosic compound which is preferably a cellulose ether. Several cellulose ether compounds are known and produced commercially by replacing the hydroxyl groups of beta-anhydroglucose rings in the linear chains of cellulosic compounds or polymers with one or more organic substituents. The chemical nature, quantity, and distribution of the substituent groups govern such properties as solubility, surface activity, film characteristics and biodegradation. Generally, cellulose ethers can be divided into water-soluble and organic soluble cellulose ethers. Water-soluble cellulose ethers are useful in the present invention because the contacting step described below employs water or an aqueous solution to wash the cellulosic compound from the admixture of thermoplastic polymer and cellulosic compound, thus creating the desired porous polymer. Although a water-soluble cellulose ether is preferred, organic-soluble cellulose ethers can be employed in this invention, provided that an organic solvent is employed to contact the admixture which does not also dissolve the thermoplastic polymer.

Typical water-soluble cellulose ethers include sodium carboxymethyl cellulose, sodium carboxymethyl 2-hydroxyethyl cellulose, 2-hydroxyethyl cellulose, methyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydroxypropyl cellulose which have been commercially produced. Typical organic-soluble cellulose ethers which have been commercially produced include ethyl cellulose, ethyl 2-hydroxyethyl cellulose, and 2-cyanoethyl cellulose. Of course, additional water- and organic-soluble cellulose ethers are known and are included within the scope of the present invention; however, commercially available water-soluble cellulose ethers are preferred. Most preferred are methyl cellulose, 2-hydroxypropyl methyl cellulose, 2-hydroxyethyl methyl cellulose, 2-hydroxybutyl methyl cellulose, and mixtures of these.

Generally, the cellulosic compounds employed in this invention are available in powdered and granular forms, having a white or slightly off-white color and are essentially odorless and tasteless. The cellulosics have a degree of substitution (DS) from 1.3 to about 2.0 and a molar substitution (MS) from 0.15 to about 0.86. Generally, the particle size of the powder and the amount of the cellulosic compound employed determines the porosity of the final porous thermoplastic article. It has been determined that below about 40 weight percent based on the combined weight of cellulosic compound and thermoplastic polymer, the porosity is unsatisfactory for use in most filter applications. Without being limited to any particular theory or mechanism of action, it is believed that below about 40 weight percent of cellulosic compound there is insufficient contact between particles of the cellulosic compounds to provide continuous channels from one surface of the resultant polymer matrix to another. Also, at concentrations greater than about 80 weight percent of cellulosic compound based on the combined weight of cellulosic compound and thermoplastic polymer, there appears to be insufficient thermoplastic polymer to maintain mechanical strength and integrity of the finished article. The particle size can range from coarse to fine and to a large extent depends upon the finishing operations employed during manufacture of the cellulosic compound. Further, the predetermined porosity of the finished article is affected by particle size which can be selected based on the rate of filtration desired and the nature of the filtrate. Although particle size can vary widely without affecting the process of the present invention, the cellulosic compound preferably employed ranges in particle size from 60 mesh to about 325 mesh and more preferably from 100 mesh to about 200 mesh.

The cellulosic compound is admixed with a polymer which subsequently forms the continuous phase or polymer matrix. Although thermoset polymers can be used in this invention, the mixing and heat setting techniques preferably employed are more suitable to thermoplastic polymers, such as polyolefins. Thus, the more easily and inexpensively the polymer can be admixed with the cellulosic compound and flowed into a continuous phase, the better processing and less cost is required to produce the porous polymer article of this invention. A number of thermoplastic polymers are available for use in the present invention. Commercially available thermoplastic polymers which are substantially inert to or react only slightly with the cellulosic compound are more desirable to prevent unwanted side reactions which interfere with the subsequent removal of the cellulosic compound. As typical thermoplastic polymers which are suitable for this invention there may be mentioned polyolefins, polystyrenes, polyvinyl alcohols, polyvinyl chlorides, polyacetates, polyamines, polyamides, polyacrylates, polyesters, polyethers, polyaromatics, polycarbonates, and the like. Preferably, polyolefins, which include polyethylene, polypropylene, polybutylene, and polybutadiene, are useful in the invention. Also, polyethylene, chlorinated polyethylene, and polyvinyl chloride are more preferred. Each of these preferred polymers are well known, commercially available and various specific formulations can be used in the present invention with a great degree of satisfaction. Many times the end use determines the type of polymer employed for the porous polymer article of the present invention. Especially preferred uses include battery separators which traditionally have employed polyethylene and polyvinyl chloride polymer resins.

The thermoplastic polymers are preferably in the form of powder or granules. However, the particle size is less important because the particles are heated to molten form in order to form a continuous phase. Thus, it is only necessary that the thermoplastic polymer powder or granules be of a size for convenient and uniform blending with the cellulosic compound. It is preferable that the thermoplastic polymer particles have a density which is not substantially less than or greater than the cellulosic compound so that upon admixture the two materials do not separate or stratify, but are uniformly and evenly distributed throughout the admixture. While it is not possible to say with a great degree of certainty how great a density difference can be tolerated, it is preferred that the density difference be not greater than about twenty percent so that settling and separation after admixing does not occur. Preferably, the viscosity of the cellulosic compound, such as methyl cellulose, has a viscosity in a 2 weight percent aqueous solution at 20° C. of 3 to about 100,000 centipoise (0.003 to 100 pascal-seconds).

According to the present invention, the cellulosic compound and the thermoplastic polymer, preferably both in powder form, are admixed together forming a substantially uniform blend. It is immaterial how the admixture is made, but using powder blending or mixing equipment which is commercially available is entirely satisfactory. Further, so far as is known it is immaterial which ingredient is added first, whether one ingredient is added to the other or whether both ingredients are added together. Any convenient mixing technique can be employed having reference to sound engineering judgment and economic operation within the discretion of skilled artisans in the industry.

The substantially uniform admixture is then formed into the desired shaped of the final article, but still containing the cellulosic compound. Formation can conveniently be carried out under heat and pressure in equipment commonly used for polymer processing. Typical polymer processing equipment includes compression molding presses, helical screw extruders, injection molding and the like. Preferably, the admixture is compression molded or extruded into sheet or film. The forming temperatures depend primarily on the softening and melting point of the thermoplastic polymer because most cellulosic compounds useful in this invention melt at relatively high temperatures and char when they melt. Typical temperatures for polymer melting will range from about 200° to about 400° F. (98°–204° C.) and more preferred temperatures range from about 300 to about 400° F. (149°–204° C.). A most preferred forming temperature range is from about 340° to about 360° F. (about 171°–182° C.), again depending on the thermoplastic polymer employed. The pressure can be set at a level such that when the thermoplastic polymer becomes softened or molten, it flows around the cellulosic compound particles forming a continuous phase. Such pressures will depend on the polymers employed; however pressures of from about 180 to about 2500 pounds per square inch (.3 to about 176 kg per square centimeter) are preferably employed and more preferably from about 300 to about 1200 pounds per square inch (.54 to about 86 kg per square cm.). Once the article is formed by heat and pressure into the finally desired shape, it is cooled to set the thermoplastic polymer. At this stage the cooling should take place under continued pressure so that any detailed shape features will not be lost by further flowing of the thermoplastic polymer before the freezing point is reached. Once the freezing point is attained, the pressure can be released because the shape of the article will no longer change.

The formed article is contacted with a solvent for the cellulosic compound in the polymer matrix. If the cellulosic compound is water soluble, water or an aqueous solution can be employed to dissolve at least a substantial portion of the cellulosic compound from the polymer matrix. This is a difficult process because the water, for example, contacts initially only that portion of the cellulosic compound which is exposed to the surface of the polymer matrix. It is helpful to use water at a temperature less than about 80° C. because at temperatures above this point a thermal gellation occurs in many water-soluble cellulose ethers which renders them insoluble. Preferably, so that thermal gellation does not occur it is preferred to contact the polymer matrix with water at less than 20° C. Although temperatures down to about 0° C. can be used, more preferably the contacting temperature can range from 10° to 18° C. Because the cellulose is trapped in the polymer's matrix, it has been found useful to flow the water or aqueous solution over the polymer matrix in order to obtain good contact. More preferably the polymer matrix can be fully or partially immersed in a flowing contacting medium, such as water or an aqueous solution. As a result of the contacting step, dissolution of from 95 to about 85 weight percent of the cellulosic compound is achieved. Further, for best dissolution of the cellulosic compound in the contacting medium cellulosic materials having a lower range of viscosity, which are generally cellulosic compounds of lower molecular weight, are preferred. These lower viscosity range cellulosic materials form lower viscosity aqueous solutions and are, therefore, more easily handled.

Although the contacting has been described hereinabove primarily with respect to water-soluble cellulose compounds, which are preferred, the organic-soluble cellulosic compounds may also be employed in this invention and, if so employed, are contacted with a suitable organic solvent to remove the organic-soluble cellulosic compounds from the polymer matrix in the same manner as described for the water-soluble cellulosic compounds. Typical solvents should not also dissolve or substantially soften the thermoplastic polymer and are selected from alcohols, ketones, aromatic hydrocarbons, dipolar solvents and the like. Specifically, the solvents more preferably employed for organic-soluble cellulose ethers in the polymer matrix include ethanol, propanol, isopropyl alcohol, butanol, benzene, xylene, toluene and the like, including mixtures thereof.

Once the major portion of the cellulosic compound has been removed from the polymer matrix the porous polymer resulting can be washed, dried and fabricated into whatever end item articles are desired. Usually fabrication results in cutting or folding to size or a particular shape for placement in filter cartridges or frames as in battery separators, kidney filters, or reverse osmosis membranes and the like.

Alternatively, the fabrication step can be carried out and then the cellulosic compound contacted with water or an aqueous solution or with a suitable organic solvent, followed by washing and drying.

It should be understood that various additional ingredients can be included in the thermoplastic polymer which are standard industry practice depending on the use contemplated for the porous polymer of this invention. Typical additive materials include plasticizers, antioxidants, flame retardants, impact modifiers, fillers, modulus of elasticity additives and the like.

The following procedure is used to more specifically illustrate the best mode presently known to carry out specific embodiments of the invention.

EXAMPLE

Various percentage mixtures (by weight) of powdered polyethylene and F-50 Methocel ® a trademark of the Dow Chemical Company identifying a cellulose ether with a methoxyl content of 27.0–30.0% and a hydroxypropoxyl content of 4.0–7.5%, including 100%, 90%, 80%, 75%, 70%, 60%, 50%, 40%, 30%, and 25%, all of polyethylene with the remainder Methocel ® were thoroughly mixed in a vessel to insure even dispersion. Then 20 grams of each mixture were manually spread onto a polytetrafluoroethylene sheet measuring about 6×6 inches (15×15 cm.) in a thin even coat. Another polytetrafluoroethylene sheet was placed on top and the sheets were pressed while heating at 350° F. (177° C.) in a Pasadena press according to the following procedure:

5 tons force (305 pounds per square inch, 21.5 Kg per square centimeter) for 3 minutes, 20 tons force (1222 pounds per square inch, 85.9 Kg per square centimeter) for 3 minutes, transfer to a cooling press and 20 tons force (1222 pounds per square inch, 85.9 Kg per square centimeter) for 3 minutes The last pressure stage was during cooling to ambient temperature to set the polyethylene cellulose admixture sheet.

Following removal from the press, several one-inch (2.54 cm.) diameter disks were punched from the sheet to leach or wash the Methocel ® from the polyethylene matrix. Each sheet produced from 25 to 27 disks ranging in thickness from 0.012 to 0.032 inches (0.03 to 0.081 cm). The thinnest sheets contained 40% Methocel ® or less. As a greater percentage of the methyl cellulose was included the sheets became thicker, but the variation in thickness for all sheets and disks was fairly constant, being +0.005 inches (+0.013 cm.).

Various washing or leaching techniques were tried including hand scrubbing for 20 minutes in cold tap water. The loss of slippery feel was noted. Then the hand scrubbed disks were totally immersed in a stirred vessel for 5 days with the water changed twice daily. Subjectively, this seemed to extract little of the cellulose ether from the polymer matrix. The most effective wash step was a constant flush of water with the disks in a small container having a rapidly flowing stream of fresh water constantly flowing over them. After 24 hours, all but about 15 weight % of the methyl cellulose was leached from the polymer matrix. This residue is believed to be totally encapsulated and unextractable by the water.

Porosity of the disks was determined by covering a ¾-inch (1.91 cm) hole drilled in the top of a plastic bottle with a disk and sealing with a silicone adhesive. A constant head of 4 inches (10.16 cm) of water was maintained over the disk. The weight of water passing through the disk over time was measured to give the flow rate, as shown in the following Tables

TABLE 1

Flow of water through filter prepared using admixture of 75% Methocel ®/35% Polyethylene

| time (minutes) | amount flowed (ml) 1st trial | 2nd trial |
| --- | --- | --- |
| 0 | 189.4 | 198.5 |
| 10 | 209.2 | 203.2 |
| 20 | 217.4 | 207.9 |
| 30 | 224.8 | 212.7 |
| 40 | 231.5 | 217.0 |
| 50 | 238.2 | 221.3 |
| 60 | 244.4 | 225.7 |
| 70 | 250.5 | 230.8 |

TABLE 2

Flow of water through filter prepared using admixture of 60% Methocel ®/40% Polyethylene

| time Minutes | amount flowed (ml) | flow rate (ml/10 min.) |
| --- | --- | --- |
| 0 | 198.4 | |
| 10 | 229.4 | 31.0 |
| 20 | 257.6 | 28.2 |
| 30 | 284.9 | 27.3 |
| 40 | 292.6 | 7.7 |
| 50 | 334.3 | 41.8 |
| 60 | 358.1 | 23.8 |
| 70 | 379.1 | 21.0 |
| 80 | 399.8 | 20.7 |
| 90 | 419.4 | 19.6 |
| 100 | 438.0 | 18.6 |
| 110 | 455.8 | 17.8 |

TABLE 3

Flow of water through filter prepared using 60% Methocel ®/40% Polyethylene

| time (minutes) | amount flowed (ml) | flow rate (ml/10 min.) |
| --- | --- | --- |
| 0 | 147.1 | |
| 10 | 208 | 60.9 |
| 20 | 259.5 | 51.5 |
| 30 | 309.6 | 50.1 |
| 40 | 352.5 | 42.9 |
| 50 | 390.1 | 37.6 |
| 60 | 423.9 | 42.8 |
| 70 | 454.5 | 21.5 |
| 80 | 481.3 | 26.8 |
| 90 | 506.6 | 25.3 |
| 100 | 530.0 | 23.4 |
| 110 | 549.7 | 19.7 |
| 120 | 568.9 | 19.2 |
| 130 | 578.4 | 7.5 |
| 140 | 587.5 | 9.2 |
| 150 | 608.7 | 21.2 |
| 160 | 621.9 | 13.2 |
| 170 | 637.4 | 15.5 |
| 180 | 651.6 | 14.2 |
| 190 | 664.7 | 13.1 |
| 200 | 677.3 | 12.6 |
| 210 | 689.6 | 12.3 |

From the above and other experiments the use of an admixture of less than about 40 weight percent of cellulosic compound does not permit sufficient pores in the polymer matrix to permit significant filtration to proceed. When the concentration of cellulosic compound used in the admixture is greater than about 80 weight percent the resultant porous polymer has insufficient strength, and structural integrity and less filtration ability except for the most coarse filtration steps.

For cellulosic compound concentrations in the admixture between 40 and 80 weight percent, a second and third experiment with the same disk evidenced decreased ability to pass the water and, hence, a decreased flow rate. However, if the filter were thoroughly dried between runs, a similar filtration rate was observed. A most preferred filter material is prepared from an admixture of 40 weight percent polyethylene and 60 weight percent Methocel ® brand of methyl cellulose.

Having described the present invention, one skilled in the art can envision various changes within the scope of the invention. Therefore, it is desired to limit the invention only by the lawful scope of the appended claims.

We claim:

1. A process for preparing a porous thermoplastic polymer article having a predetermined degree of porosity, which process consists of the steps of
   (a) admixing a water soluble cellulosic compound of predetermined particle size and a polyolefin thermoplastic compound which is insoluble in water;
   (b) forming the admixture into the shape desired for said article under conditions sufficient to form a continuous phase of said thermoplastic compound and a non-continuous phase of said cellulosic compound; and
   (c) contacting said admixture with water to solubilize a major portion of said cellulosic compound and separating the aqueous cellulosic compound-containing solution from the thermoplastic polymer whereby said porous thermoplastic polymer article having a predetermined degree of porosity is produced.

2. The process of claim 1 in which said cellulosic compound is a cellulose ether.

3. The process of claim 2 in which said cellulose ether is selected from methylcellulose, hydroxyethylcellulose, hydroxypropylcellulose, hydroxyethylmethylcellulose, hydroxyethylhydroxypropylcellulose and mixtures thereof.

4. The process of claim 3 in which said cellulose ether is a methylcellulose.

5. The process of claim 4 in which said methylcellulose viscosity of a 2% solution in water at 20° C. is in the range of from about 3 to about 100,000 cps (0.003 to about 100 pascal seconds).

6. The process of claim 1 in which said thermoplastic compound is selected from a polyolefin, a chlorinated polyethylene or a polyvinyl chloride.

7. The process of claim 6 in which said thermoplastic compound is a polyolefin.

8. The process of claim 7 in which said polyolefin is selected from polyethylene, polypropylene, and polybutylene.

9. The process of claim 8 in which said polyolefin is polyethylene.

10. The process of claim 9 in which said polyethylene is selected from high density polyethylene and low density polyethylene.

11. The process of claim 10 in which said polyethylene is high density polyethylene.

12. The process of claim 6 in which said thermoplastic compound is a chlorinated polyethylene.

13. The process of claim 1 in which from about 40 to about 70 weight percent of said cellulosic compound is admixed with from about 30 to about 60 weight percent of said thermoplastic compound.

14. The process of claim 13 in which from about 40 to about 60 weight percent of said cellulosic compound is admixed with from about 60 to about 40 weight percent of said thermoplastic compound.

15. The process of claim 1 wherein said cellulosic and said thermoplastic compounds are in the form of blendable powders.

16. The process of claim 15 in which said blendable powders of said cellulosic and said thermoplastic compounds have a difference in density not greater than about 20 percent 17. The process of claim 1 further characterized in that the forming of said step (b) is carried out by heating said admixture to a temperature sufficient to melt and flow said thermoplastic compound, forming a continuous phase.

18. The process of claim 17 still further characterized in that said forming and said heating are carried out in an apparatus selected from a compression molding press, a helical screw extruder or an injection molding machine.

19. The process of claim 18 in which said apparatus is a compression molding press.

20. The process of claim 18 in which said apparatus is a helical screw extruder.

21. The process of claim 18 in which said apparatus is an injection molding machine.

22. The process of claim 17 in which said temperature is in the range of about 300°–400° F. (149°–204° C.)

23. The process of claim 22 in which said apparatus is a compression molding press.

24. The process of claim 23 in which said temperature is in the range of about 340° to about 360° F. (about 171 to about 182° C.).

25. The process of claim 17 wherein after said heating and flowing of said step (b), said admixture is cooled for a period sufficient to solidify said molten thermoplastic compound and set said admixture.

26. The process of claim 25 wherein said admixture is cooled to about ambient conditions.

27. The process of claim 1 in which said contacting of said step (c) is carried out by complete immersion of said article in flowing water.

28. The process of claim 27 in which said contacting is carried out at a temperature of from about 10 to about 80° C.

29. The process of claim 27 in which said contacting results in solubilization of 95 to about 85 weight percent of said cellulosic compound.

30. The process of claim 1 in which said cellulosic compound is a cellulose ether and said thermoplastic compound is a polyolefin.

31. The process of claim 30 in which said cellulose ether is selected from methylcellulose, hydroxyethylcellulose, hydroxypropylcellulose, hydroxyethylhydroxypropylcellulose, and hydroxyethylmethylcellulose.

32. The process of claim 31 in which said cellulose ether is a methylcellulose.

33. The process of claim 31 in which said polyolefin is selected from polyethylene, polypropylene and polybutylene.

34. The process of claim 33 in which said polyolefin is polyethylene.

35. The process of claim 30 in which from about 40 to about 70 weight percent of said cellulosic compound is admixed with from about 30 to about 60 weight percent of said thermoplastic compound.

36. The process of claim 35 in which said cellulosic and said thermoplastic compounds are blendable powders having a density difference not greater than about 20 percent.

37. The process of claim 1 in which said cellulosic compound is a methylcellulose and said thermoplastic compound is a polyethylene.

38. The process of claim 37 in which from 40 to about 60 weight percent of said methylcellulose is admixed with from about 60 to about 40 weight percent of polyethylene and heated to a temperature of from about 325 to about 375° C. for a period sufficient to flow said polyethylene into a continuous phase; and thereafter cooling said admixture.

39. The process of claim 38 in which said heating is carried out in a compression molding press and the cooled admixture is contacted by immersing in flowing water.

40. The process of claim 39 wherein said contacting is carried out at a temperature of from about 10 to about 80° C.

41. The process of claim 39 wherein prior to said contacting the admixture is fabricated into end use application shapes.

* * * * *